United States Patent
Anderson, Sr. et al.

(10) Patent No.: US 10,081,734 B1
(45) Date of Patent: Sep. 25, 2018

(54) LOW GLOSS DRY ERASE PAINT

(71) Applicant: Exhibit One, Inc., Canton, GA (US)

(72) Inventors: Andy W. Anderson, Sr., Jasper, GA (US); Michael B. Winchester, Canton, GA (US)

(73) Assignee: Exhibit One, Inc., Canton, GA (US)

( * ) Notice: Subject to any disclaimer, the term of this patent is extended or adjusted under 35 U.S.C. 154(b) by 0 days.

(21) Appl. No.: 15/345,645

(22) Filed: Nov. 8, 2016

(51) Int. Cl.
| | |
|---|---|
| C09D 7/42 | (2018.01) |
| C09D 5/00 | (2006.01) |
| C09D 175/08 | (2006.01) |
| B05D 3/10 | (2006.01) |
| B05D 5/00 | (2006.01) |
| B05D 1/28 | (2006.01) |
| B43L 1/00 | (2006.01) |
| C09D 7/47 | (2018.01) |
| C09D 7/62 | (2018.01) |
| C09D 7/63 | (2018.01) |
| C09D 7/80 | (2018.01) |

(52) U.S. Cl.
CPC ............... *C09D 7/42* (2018.01); *B05D 1/28* (2013.01); *B05D 3/108* (2013.01); *B05D 5/00* (2013.01); *B43L 1/00* (2013.01); *B43L 1/002* (2013.01); *C09D 5/00* (2013.01); *C09D 7/47* (2018.01); *C09D 7/62* (2018.01); *C09D 7/63* (2018.01); *C09D 7/80* (2018.01); *C09D 175/08* (2013.01)

(58) Field of Classification Search
None
See application file for complete search history.

(56) References Cited

U.S. PATENT DOCUMENTS

| | | | |
|---|---|---|---|
| 3,252,844 A | 5/1966 | Hechelhammer et al. | |
| 4,884,375 A | 12/1989 | Wendt | |
| 5,037,702 A | 8/1991 | Pitts et al. | |
| 5,643,510 A | 7/1997 | Sucech | |
| 5,827,072 A | 10/1998 | Neufer et al. | |
| 6,530,664 B2 | 3/2003 | Vanderwerf et al. | |
| 7,713,375 B2 | 5/2010 | Schneider | |
| 8,197,952 B2 | 6/2012 | Yu et al. | |
| 8,722,792 B1 | 5/2014 | Anderson, Sr. et al. | |
| 8,722,795 B1 | 5/2014 | Anderson, Sr. et al. | |
| 2003/0150190 A1 | 8/2003 | Schroth | |
| 2004/0026438 A1 | 2/2004 | Tyra et al. | |
| 2004/0077497 A1 | 4/2004 | Korane et al. | |
| 2007/0142517 A1* | 6/2007 | Anderson, Sr. | B43L 1/002 524/261 |
| 2009/0148603 A1* | 6/2009 | Goscha | B05D 5/08 427/256 |
| 2010/0028667 A1 | 2/2010 | Love | |
| 2010/0092671 A1* | 4/2010 | Goscha | B43L 1/00 427/256 |
| 2011/0300294 A1* | 12/2011 | Nachtman | B43L 1/00 427/189 |
| 2014/0303303 A1* | 10/2014 | Benson | C09D 5/4465 524/407 |
| 2014/0329012 A1 | 11/2014 | Mahli et al. | |
| 2016/0236444 A1 | 8/2016 | Immordino et al. | |

FOREIGN PATENT DOCUMENTS

| | | |
|---|---|---|
| WO | WO 2011/094350 | 8/2011 |

* cited by examiner

*Primary Examiner* — Erma C Cameron
(74) *Attorney, Agent, or Firm* — Smith Gambrell & Russell LLP

(57) ABSTRACT

A dry erase writing surface has a low gloss level of 35-60 that can be utilized as both a writable/erasable dry erase surface and a projection surface, formed by a single component, 100% solids polyurethane, ambient cured, dry erase paint formulation. The paint formulation includes a low NCO isocyanate, a cure accelerating catalyst, a flow, leveling, and defoaming agent, a silica matting agent to reduce the gloss level of the applied coating, and an aliphatic hydrocarbon. The surface is ready for use in 24 hours. The coating has a low VOC of between 49 g/l and 99 g/l. The coating is applied to a prepared surface of a substrate to form a film thickness of 1-3 mils. Marks on the dry erase surface remain virtually invisible after 2500 cycles.

9 Claims, No Drawings

LOW GLOSS DRY ERASE PAINT

FIELD OF THE INVENTION

This invention generally relates to a dry erase writing surface. More particularly, the invention relates to a single component, 100% solids polyurethane, ambient cured, dry erase paint that produces a durable dry erase surface (marks invisible after 2500 cycles) with a surface gloss level of 35-60 (60 degree gloss ASTM D523) that is therefore suitable for light projection displays.

BACKGROUND OF THE INVENTION

Dry erase surfaces have virtually replaced chalkboards as the preferred writing surface for corporate use, training centers, schools, and a wide range of other end uses. Dry erase surfaces are most commonly supplied in pre-manufactured whiteboards of various sizes. Pre-manufactured whiteboards are limited by a specific number of board size options. Conventional dry erase surfaces for pre-manufactured whiteboards include porcelain, ceramic, melamine, and polyvinyl chloride (PVC).

Dry erase PVC based wall coverings can also be used to create a dry erase surface. Dry erase wallcoverings provide a dry erase writing surface that can be created in unlimited length variations. The maximum width, however, of these materials is 60 inches. Therefore, three horizontally hung drops are required to cover an entire nine foot high wall from base to ceiling, which means that two seams exist across a nine foot wall height.

More recently, field applied dry erase coatings or paint have been introduced to the dry erase market. These coatings or paint are applied at the site of the installation much like typical wall paint is installed. As a result, an infinite range in sizes and configurations for the writing surface can be achieved. Unlike whiteboards or even dry erase wallcovering, these dry erase coatings or paint can be applied to a wall surface from floor to ceiling in a seamless fashion giving the treated writing surface a monolithic appearance, which is very desirable.

With the exception of the single component dry erase coating disclosed in the U.S. Pat. No. 8,722,792 and U.S. Pat. No. 8,722,795, both owned by the assignee of the present invention, all of the existing dry erase coatings and paint currently on the market are two component products requiring the mixing of a catalyst before application. For example, U.S. Pat. No. 6,265,074, issued to Shah, et al. discloses a dry erase, two-part epoxy coating that is applied to a flexible substrate to which an adhesive is applied. Similarly, U.S. Pat. No. 6,312,815 issued to Macris et al. and U.S. Pat. No. 4,716,056 issued to Fox et al. disclose two-part epoxy coatings that may be applied to treated and untreated surfaces. Two-part epoxy type coatings are impractical in the field, requiring highly skilled labor and specific equipment for mixing and application. Furthermore, once the two parts of the epoxy are mixed, the product has a very limited pot life measured in hours, not days or weeks.

Other methods of producing dry erase surfaces include fire-coated glazes, such as that disclosed in U.S. Pat. No. 4,123,590 issued to Hasegawa et al. As disclosed by U.S. Pat. No. 5,037,702, issued to Pitts et al., other one part coatings in the art require specialized curing such as high temperatures, ultraviolet (UV) light, and/or electron beam (EB) curing light in order to exhibit favorable dry erase characteristics. For example, U.S. Pat. No. 6,103,327 issued Bragole et al. discloses a thermally cured paint. White is the predominate color being sold and utilized.

All of the dry erase coatings, including paint and whiteboard surfaces described above, have a high gloss level (90-100, 60 degree gloss ASTM D523). A high gloss writing surface will generally offer superior marker removability because by nature a smoother surface has no "texture" to capture marker residue. Such high gloss dry erase writing surfaces, however, possess several drawbacks. First, a glossy wall surface generally does not fit into a traditional decorative environment with conventional matte or flat surfaces produced by ordinary wall paints. Second, a glossy wall surface cannot be utilized as a light projection surface such as for Power Point type presentations. Having a writing surface that also acts as a light projectable surface is of major importance to designers and space planners for the commercial interiors market. At present, the options for light projection dry erase surfaces have been limited to porcelain boards and a few dry erase wallcovering products. Porcelain boards have the limited size options noted earlier, and the dry erase wallcovering options have not performed nearly as well as the gloss versions in terms of marker removal. The surface texture of a light projectable writing surface tends to capture and hold the marker residue, creating what is referred to as ghosting, which is simply not getting the full removal of the marker residue from the writing surface.

Consequently, a low gloss or matte dry erasable writing surface that does not compromise on marker removal performance is highly desirable. Optimally, such a dry erasable writing surface should be able to achieve a gloss level in the 35-60 range (60 degree gloss test ASTM D523) to enable the writing surface to also act as a light projectable surface and have an appearance similar to a matte surface created by a conventional wall paint. Further, the dry erasable and projectable surface should be capable of being created by field applying a coating or paint that is a one component product, thereby not limiting the application process by the pot life inherent in two component dry erasable coatings or paint.

The inks of the typical, dry erase markers, such as Sanford Expo dry erase marker (Sanford Division of Newell Rubbermaid, Inc., 2707 Butterfield Road, Oak Brook, Ill. 60523) should not penetrate a dry erase surface so that erasing is accomplished with minimal effort. Those standard markers should not "ghost", and as a result, cleaners, such as Sanford Blue Expo white board cleaner (containing 2-Butoxy Ethanol/Acetate, Isopropyl Alcohol), can be used to maintain dry erase surfaces.

SUMMARY OF THE INVENTION

The present invention is a paint that addresses the drawbacks of the prior art. The paint of the present invention is a single component, ambient cured, dry erase paint that when applied to a surface by conventional painting techniques imparts dry erase characteristics to the surface including producing a durable dry erase surface (marks invisible after 2500 cycles) with a surface gloss level of 35-60 (60 degree gloss ASTM D523) that is therefore suitable for light projection displays. More particularly, the paint formulation of the present invention comprises between 87%-92% by weight of a low NCO isocyanate, a cure accelerating catalyst, a defoaming agent, a matting additive to reduce the gloss level of the applied coating, and a turpentine-like diluent.

The paint of the present invention has inherent properties of hardness, moisture resistance, chemical resistance, abrasion resistance, and low gloss, which together produce a superior dry erase surface. The paint of the present invention cures, under ambient conditions, to a matte finish that provides a durable dry erasable painted surface that is suitable for light projection displays. The surface hardens as the formulation of the dry erase paint continues to cross link and harden, typically requiring a 24-hour minimum curing time before the surface can be used. This can vary because ambient conditions may vary. In contrast, most two component systems, which require a separate catalyst, require seven days before the surface is ready for marker use. The paint of the present invention also has low VOC of between 49 g/l and 99 g/l.

While white is typically the color of choice for dry erase displays, the dry erase paint formulation of the present invention is available as a clear coating to be applied over any color substrate so that the final dry erase surface may have an unlimited color selection based on the color of the substrate. Preferably, the substrate color is provided by a tinted primer coat. For example, a display conveying warnings may be colored red and a display conveying safety information may be colored green based on the substrate color. In an educational or corporate environment, team or institutional colors may be popular choices, again based on the substrate color and pattern.

The dry erase paint of the present invention exhibits superior release properties. A standard dry erase marker, such as the Sanford Expo BOLD, LOW ODOR, or BULLET dry erases markers (Sanford Division of Newell Rubbermaid, Inc., 2707 Butterfield Road, Oak Brook, Ill. 60523) will not penetrate the surface, thereby permitting erasure of the marks with minimal effort. When used with the formulation of the paint of the present invention, those standard markers will not "ghost", i.e. leave residual marks for up to 2500 cycles. Moreover, unlike conventional dry erase boards and surfaces, should the painted surface contemplated by the present invention ever fail to perform due to mistreatment or accidental damage, the surface can be readily re-painted, bringing the surface back to its original level of performance. Indeed, the dry erase paint of the present invention may be used to repair or restore a conventional dry erase surface that has been damaged or otherwise has had its dry erase properties diminished through excessive, and in some instances routine use. This is a much more economical repair than conventional methods, particularly with respect to PVC dry erase wallcoverings that typically require the complete removal of the wall covering, repairing and prepping the wall surface to a level five finish, and re-hanging the PVC dry erase wallcovering. The paint of the present invention also has them be used as an anti-graffiti coating, clean room coating, industrial wall coating, and educational wall and floor coatings.

The dry erase paint of the present invention may be used by any commercial painting contractor and particularly lends itself to home and to do-it-yourself applications. Persons undertaking a do-it-yourself project are unlikely to invest in the costly equipment required for two-part epoxy finishes or prohibitively expensive curing systems required for other one part formulations. The dry erase paint of the present invention can be applied to many surfaces including gypsum wall board, chalkboards, whiteboards, dry erase PVC wallcoverings and other plastic surfaces, metal, medium density fiberboard (MDF), masonry, stone, and any number of other wall or display surfaces. A diluent can be employed with the paint formulation to achieve a desired viscosity for application.

The dry erase paint of the present invention is typically dry to touch in around eight hours and the surface is usable within a day (24 hours) depending on ambient conditions. The open time of the dry erase paint of the present invention is typical of latex paint, e.g. 4-5 hours. A single component coating for the purposes of the invention is one which is ready to use without premixing in contrast to a two-component coating material where, owing to high reactivity of the binder component and crosslinking, the components have to be kept in separate vessels. The two components are not mixed until shortly before application, when they react generally without additional activation.

The low gloss dry erasable surface is achieved by the present invention by a paint formulation that can reduce the current gloss level of coatings described in U.S. Pat. No. 8,722,792 and U.S. Pat. No. 8,722,795, owned by the assignee of the present invention, by over 60%, while not diminishing the marker removal performance. This low gloss dry erase coating displays a non-glare writing surface that enables the dry erase writing surface also to be used as a light projection surface for Power Point type presentations. The current high gloss dry erase coatings on the market cannot be used as projection surfaces due to the substantial light reflectance that those high gloss surfaces create. Those high gloss dry erase surfaces typically measure 90-100 on a 60 degree gloss measurement (ASTM D523). The surface created by paint of the present invention has the capability of producing a 60 degree gloss measurement as low as 25, and can be formulated to increments from 35 to 60 depending on various alterations in the additive levels.

The lower gloss level of the paint of the present invention also has the advantage of matching the existing gloss levels of typical wall paints when applied to adjacent wall surfaces. Conventional dry erase paints produce a high gloss finishes that are two to three times glossier than the surrounding painted surfaces. Consequently, the high gloss writing surfaces due not blend into the surrounding décor and cause a heightened visual awareness of the textural nature of the wall finish. The orange peel texture of most standard walls is virtually invisible to the naked eye because those painted wall surfaces are typically in the 35-60 gloss level. When a conventional clear dry erase coating is applied over that same wall surface, bringing the gloss level up to 90-100, that existing wall texture is magnified and becomes an aesthetic negative. When dry erase paint of the present invention is applied over that same wall, the wall surface maintains the same matte appearance, yet still offers the added benefit of a dry erase writing surface.

The paint of the present invention can, if desired, be packaged in kit form. The components of the kit can include written instructions, paint applicator, e.g. brush, roller, foam applicator, etc. The actual components included in the kit are based on a desired application. The kit can also be packaged to include material and material amounts which are suitable for repair of a preexisting whiteboard. The amount of paint included in the container can be based on the surface to be treated. Because no premixing is required for the paint of the present invention, as compared two-component systems (ones that include a separate catalyst or agent), any unused paint can be saved for further use in the original container by resealing the container Further objects, features and advantages will become apparent upon consideration of the following detailed description of the invention when taken in conjunction with the drawings and the appended claims.

DETAILED DESCRIPTION OF THE PREFERRED EMBODIMENTS

The dry erase paint of the present invention generally is formulated with a mixture of a low NCO isocyanate, a cure accelerating catalyst, a silicone-based flow, leveling, and defoaming agent, a matte additive to reduce the gloss level of the applied coating, and an aliphatic hydrocarbon diluent. The dry erase paint formulation includes the low NCO isocyanate in the range of between about 87%-92% by weight of the formulation, the cure accelerating catalyst in the range of between about 0.07%-0.08% by weight, the silicone-based flow, leveling, and deforming agent in the range of between about 0.05%-0.06% by weight of the formulation, and the aliphatic hydrocarbon diluent in the range of between about 3% and 8% by weight of the formulation.

The low NCO isocyanate has an NCO content of 17% (17.3+/−0.5% per specification) or less. The desired isocyanates have a viscosity between 500 and 2500 centipoise. One particularly useful isocyanate for use in connection with the present invention is Basonat HA 2000 available from BASF Corporation, Florham Park N.J.

Normally pure isocyanate in a range around 90% by weight of the total paint formulation is not considered a viable coating option due to a variety of factors. Isocyanate by itself will not dry or cure in a reasonable time period when applied, so components such as driers and catalysts must be added. Adding a mineral spirit solvent to isocyanate as a diluent, adding a flow, leveling, and defoaming agent, and adding a cure accelerating catalyst addresses the drying and curing issues.

The flow, leveling, and defoaming agent added to the formulation, among other attributes controls the generation of carbon dioxide off gassing. The defoaming agent of the present invention formulation is a silicone-based ingredient. Particularly, the defoaming agent is polyether modified polymethylalkylsiloxane. One particularly suitable defoaming agent is Byk 320, a silicone containing surface additive for solvent-borne coating systems with a slight reduction of surface tension, available from BYK Additives Inc., Austin, Tex. Further, by requiring the use of a high density, melamine foam roller cover for the coating application, film thickness and the ultimate surface smoothness can be controlled. By maintaining a wet film thickness of 1-3 mils (calculated film thickness at 200 square feet per quart is 3 mils) the foaming aspect of the isocyanate is kept in check.

The diluent of paint formulation of the present invention serves as a thinning agent and in the formulation of the present invention also reduces surface gloss. The diluent is a turpentine-like aliphatic hydrocarbon. One suitable diluent is Odorless Turpenoid® available from Martin F. Weber Company, Philadelphia, Pa. Odorless Turpenoid® has the same painting properties and drying time as turpentine yet is free from the strong and characteristic odor. Even with the turpentine-like diluent, the paint of the present invention has low VOC of between 49 g/l and 99 g/l and contains none of the restricted chemical components: acrolein, acrylonitrile, antimony, benzene, butyl benzyl phthalate, cadmium, di (2-ethylhexyl) phthalate, di-n-butyl phthalate, di-n-octyl phthalate, 1,2-dichlorobenzene, diethyl phthalate, dimethyl phthalate, ethylbenzene, formaldehyde, hexavalent chromium, isophorone, lead, mercury, methyl ethyl ketone methyl isobutyl ketone, methylene, chloride, naphthalene, toluene (methylbenzene), 1,1,1-trichloroethane, and vinyl chloride.

With the proper ratio of isocyanate, catalyst, and silicone, as disclosed in the examples below, the paint can also be applied virtually bubble free. One catalyst that is suitable for the present invention is Dabco T-12 (dibutyltin dilaurate, DBTDL) available from Air Products and Chemicals, Inc, Allentown, Pa. Dabco T-12 promotes the urethane (polyol-isocyanate) or gelling reaction for the production of flexible and rigid polyurethane foams, coatings, adhesives, sealants, and elastomers.

In order to impart a matte surface of 35-60 (60 degree gloss/ASTM D523), silica is added to the paint formulation described above. As previously mentioned above, the diluent, Odorless Turpenoid® also contributes to the matte surface. Particular, the silica may be Acematt 3300, a polymer-treated thermal silica, characterized by very good matting efficiency combined with high transparency. Acematt 3300 is available from Evonik Corp., Parsippany, N.J.

A coat of the dry erase paint of the present invention may be applied to the substrate by any conventional painting methods such as brushing or rolling. The best results, however, result by rolling using Wooster Pro-Tiz, 9 inch foam roller cover, supplied by Wooster Brush Company, Wooster, Ohio. A suitably smooth dry erase surface may be obtained with a single coat of the dry erase paint applied with a high density foam roller, such as those provided by Wooster Brush Company. that minimizes coating thickness and insures surface smoothness. Ideally this application technique will achieve a desired coating thickness of between about 1-3 mils. If too light a coat is applied the desired dry erase properties may be compromised. Whereas, application of too heavy a coat causes the curing time to be extended and the coverage area for a given volume of paint reduced. Ideally a single coat is applied at the desired thickness.

After the dry erase paint has been applied to the substrate, the resulting dry erase writing surface should be allowed to dry for at least 24 hours (1 day) before using. The drying times depend on ambient conditions. The surface can be dry to the touch in just eight hours. The drying time period allows the necessary cross linking to take place resulting in a high performing writable/erasable surface.

As with any painting project, the surface being painted should be free of dirt, oils, debris, and other contaminants. The area surrounding the surface to be painted should be substantially free of residual dust, particulates, or other construction debris floating in the air because they may adhere to the paint and create unwanted particles that would be detrimental to the suitability of the resultant dry erase writing surface. A smooth surface is desired, and any pretreatment, e.g. sanding, spackling, etc., should be done prior to application of the paint. To obtain the best results, a suitable primer coat should be applied to the surface prior to applying the paint of the present invention. In tests, a coat of Kilz Premium primer, available from Masco Corporation, 21001 Van Born Road, Taylor, Mich., was applied to drywall and permitted to dry for 24 hours before applying the paint of the present invention. Color for the dry erasable surface can be provided by tinting the primer to the desired color under the clear matte coat provided by the paint of the present invention.

Below are five examples of illustrative formulations for the paint formulation of the present invention. Showing the resulting gloss level (60 degree gloss/ASTM D523).

Example #1—Gloss Level 35-40

| % by Weight | Ingredient | Purpose |
| --- | --- | --- |
| 87%-88% | Isocyanate (BASF HA - 2000) | Primary Resin/Polymer |
| 0.05%-0.06% | Polyether Modified Polymethylalkylsiloxane (Byk 320) | Flow, Leveling and Defoaming Agent |

| % by Weight | Ingredient | Purpose |
|---|---|---|
| 0.07%-0.08% | Dibutyltin Dilaurate (Dabco T-12) | Catylyst to Accelerate Cure |
| 3%-4% | Polymer Treated Thermal Silica (Acematt 3300) | Matting Agent |
| 7%-8% | Aliphatic Hydrocarbon (Turpenoid) | Thinning Agent and Gloss Reducer |

Example #2—Gloss Level 40-45

| % by Weight | Ingredient | Purpose |
|---|---|---|
| 88%-89% | Isocyanate (BASF HA - 2000) | Primary Resin/Polymer |
| 0.05%-0.06% | Polyether Modified Polymethylalkylsiloxane (Byk 320) | Flow, Leveling and Defoaming Agent |
| 0.07%-0.08% | Dibutyltin Dilaurate (Dabco T-12) | Catylyst to Accelerate Cure |
| 3%-4 % | Polymer Treated Thermal Silica (Acematt 3300) | Matting Agent |
| 6%-7 % | Aliphatic Hydrocarbon (Turpenoid) | Thinning Agent and Gloss Reducer |

Example #3—Gloss Level 45-50

| % by Weight | Ingredient | Purpose |
|---|---|---|
| 89-90 % | Isocyanate (BASF HA - 2000) | Primary Resin/Polymer |
| 0.05-0.06% | Polyether Modified Polymethylalkylsiloxane (Byk 320) | Flow, Leveling and Defoaming Agent |
| 0.07-0.08% | Dibutyltin Dilaurate (Dabco T-12) | Catylyst to Accelerate Cure |
| 3-4 % | Polymer Treated Thermal Silica (Acematt 3300) | Matting Agent |
| 5-6 % | Aliphatic Hydrocarbon (Turpenoid) | Thinning Agent and Gloss Reducer |

Example #4—Gloss Level 50-55

| % by Weight | Ingredient | Purpose |
|---|---|---|
| 90-91% | Isocyanate (BASF HA - 2000) | Primary Resin/Polymer |
| 0.05-0.06% | Polyether Modified Polymethylalkylsiloxane (Byk 320) | Flow, Leveling and Defoaming Agent |
| 0.07-0.08% | Dibutyltin Dilaurate (Dabco T-12) | Catylyst to Accelerate Cure |
| 3-4% | Polymer Treated Thermal Silica (Acematt 3300) | Matting Agent |
| 4-5% | Aliphatic Hydrocarbon (Turpenoid) | Thinning Agent and Gloss Reducer |

Example #5—Gloss Level 55-60

| % by Weight | Ingredient | Purpose |
|---|---|---|
| 91-92% | Isocyanate (BASF HA - 2000) | Primary Resin/Polymer |
| 0.05-0.06% | Polyether Modified Polymethylalkylsiloxane (Byk 320) | Flow, Leveling and Defoaming Agent |
| 0.07-0.08% | Dibutyltin Dilaurate (Dabco T-12) | Catylyst to Accelerate Cure |
| 3-4% | Polymer Treated Thermal Silica (Acematt 3300) | Matting Agent |
| 3-4% | Aliphatic Hydrocarbon (Turpenoid) | Thinning Agent and Gloss Reducer |

The resulting dry erase surfaces from Examples 1-5 were tested by erasure of the dry erase markers, and the marks were virtually invisible after 2500 cycles.

The process for formulating the dry erase paint of Example 1 of the present invention is set forth below

| Ingredient | Parts by Weight | Range by Weight | Description | Purpose |
|---|---|---|---|---|
| Basonat HA 2000 | 88 | 30-99 | Homopolymer of Hexamethylene Diisocyante | Primary Resin/Polymer |

Combine the following under dry atmosphere, high speed disperse

| Ingredient | Parts by Weight | Range by Weight | Description | Purpose |
|---|---|---|---|---|
| Dabco T-12 | 0.08 | 0.01-1.00 | Dibutyltin Dilaurate (Substitute Tin Octoate or Bismuth Octoate | Catylyst to Accelerate Cure |
| Byk 320 | 0.06 | 0.01-1.00 | Polyether Modified Polymethylalkylsiloxane Solution | Flow, Leveling, and Defoaming Agent |

Mix at high speed for 10 minutes.
Pour the above mixture over the following matting agent, which is in a separate drum.

| Ingredient | Parts by Weight | Range by Weight | Description | Purpose |
|---|---|---|---|---|
| Acematt 3300 | 4 | 1-10 | Polymer Treated Thermal Silica | Matting Agent |

After liquid mixture (first three components) is added to the Acematt, mix at high speed for 4.50 minutes.
Add the following while still being dispersed.

| Ingredient | Parts by Weight | Range by Weight | Description | Purpose |
|---|---|---|---|---|
| Odorless Turpenoid | 8 | 2-15 | Turpentine Substitute, Free from Strong and Characteristic Odor - Aliphatic Hydrocarbon | Thinning Agent and Gloss Reducer |

Continue mixing at high speed for 15 minutes.
Cast three mil film; check for craters, trash, film clarity, and color.
Fill under dry atmosphere.

While this invention has been described with reference to preferred embodiments thereof, it is to be understood that variations and modifications can be affected within the spirit and scope of the invention as described herein and as described in the appended claims.

We claim:

1. A paint formulation for producing a low gloss dry erase surface, the formulation comprising:
   a. an isocyanate with low NCO, the NCO being 17% or less by weight of the isocyanate;
   b. a flow, leveling, and defoaming agent;
   c. a cure accelerating catalyst;
   d. a polymer treated thermal silica; and
   e. an aliphatic hydrocarbon
   wherein the low gloss dry erase surface has a surface gloss level of less than 60 (60° gloss ASTM D523) and a dry erase durability of at least 2500 cycles.

2. The paint formulation of claim 1, wherein the isocyanate comprises between about 87%-92% by weight of the paint formulation.

3. The paint formulation of claim 1, wherein the aliphatic hydrocarbon is an odorless turpentine substitute.

4. The paint formulation of claim 3, wherein the aliphatic hydrocarbon comprises between about 3%-8% by weight of the paint formulation.

5. The paint of claim 1, wherein the flow, leveling, and defoaming agent is a polyether modified polymethylalkylsiloxane.

6. The paint formulation of claim 5, wherein the flow, leveling, and defoaming agent comprises between about 0.05%-0.06% by weight of the paint formulation.

7. The paint formulation of claim 1, wherein polymer treated thermal silica comprises between about 3%-4% by weight of the paint formulation.

8. The paint of claim 1, wherein the cure accelerating catalyst is a dibutyltin dilaurate solution.

9. The paint formulation of claim 8, wherein the catalyst comprises between about 0.07% and 0.08% by weight of the paint formulation.

\* \* \* \* \*